United States Patent [19]

Eckhardt et al.

[11] Patent Number: 5,261,750
[45] Date of Patent: Nov. 16, 1993

[54] BEARING ASSEMBLY

[75] Inventors: Uli Eckhardt, Speyer; Bruno Schmitt, Lampertheim, both of Fed. Rep. of Germany

[73] Assignee: Deere & Company, Moline, Ill.

[21] Appl. No.: 880,627

[22] Filed: May 8, 1992

[30] Foreign Application Priority Data

May 10, 1991 [DE] Fed. Rep. of Germany ....... 4115217

[51] Int. Cl.$^5$ .................. F16C 19/38; F16C 27/04
[52] U.S. Cl. ..................... 384/455; 384/620
[58] Field of Search ............... 384/455, 558, 619, 620

[56] References Cited

U.S. PATENT DOCUMENTS

| | | | |
|---|---|---|---|
| 2,030,104 | 2/1936 | Eksergian | 384/455 X |
| 2,118,760 | 5/1938 | Ernst | 384/455 |
| 3,795,456 | 3/1974 | Schafer | 415/72 |
| 3,934,956 | 1/1976 | Pitner | 384/455 |
| 4,124,256 | 11/1978 | de Senneville | 384/455 |

FOREIGN PATENT DOCUMENTS

| | | |
|---|---|---|
| 865559 | 2/1953 | Fed. Rep. of Germany. |
| 935288 | 11/1955 | Fed. Rep. of Germany. |
| 1199585 | 8/1965 | Fed. Rep. of Germany. |
| 2738287 | 3/1979 | Fed. Rep. of Germany ...... 384/455 |
| 2167551 | 7/1973 | France. |
| 2455208 | 11/1980 | France. |

OTHER PUBLICATIONS

"Walzlagertechnik" (Rolling Contact Bearing Technology) FAG 1984/2 Porsche Sports Racing Cars 956— Peak Performance Even for Rolling Contact Bearings (p. 28).
"Das Wälzlager im Kraffahrzeug", FAG Publ. No. 05100 (pp. 159-161, 180-185) no date.
"Die Gestaltung von Wälzlagerungen" FAG Publ. No. 00200 DA-Ausgabe, 1970 (pp. 15, 59, 133, 135, 151).
R. Hübener "Scheiben als Maschinenelemente", 17 Ant Antriebstechnik No. 9 (1978) (pp. 375-377).

*Primary Examiner*—Thomas R. Hannon

[57] ABSTRACT

A bearing assembly for a gearbox shaft which is subject to bending forces and capable of absorbing axial forces. The bearing assembly has at least one radial cylindrical roller bearing and two thrust bearings. The inner race of the radial roller bearing is supported radially as well as in one axial direction by the shaft. The thrust bearings are arranged to either side of and supported by a bearing housing that can be attached to the gearbox housing. The thrust bearing closest to the radial cylindrical roller bearing is supported in one axial direction by the inner race of the radial roller bearing. The radial roller bearing and the thrust bearings then are secured against axial movement on the shaft, e.g., by a retaining ring. The bearing housing is designed so that the bearing housing will conform to any inclination of the gearbox shaft due to shaft deflection. For this purpose, the bearing housing may have regions of varying stiffness in the circumferential direction.

11 Claims, 3 Drawing Sheets

BEARING ASSEMBLY

BACKGROUND OF THE INVENTION

1. Field of the Invention

The present invention concerns a bearing assembly for a gearbox shaft, for example, a differential drive shaft with a bevel pinion of a vehicle transmission, in which the bearing assembly is subject to bending forces and able to absorb axial thrust loads.

2. Description of the Related Art

Transmission drive lines, especially those in agricultural and other utility vehicles, frequently have gearbox drive shafts that transmit their rotational speed and their torque through a bevel gear to a further gearbox shaft. Usually these gearbox shafts are differential drive shafts.

Gearbox shafts that are unilaterally loaded by helical gears or bevel gears deflect with increasing gear loads. Helical gears simultaneously impose axial loads on the gearbox shaft that also increase with increasing gear load. These central axial forces are transmitted by thrust bearings to the bearing housing. If the gearbox shaft is inclined in the vicinity of the thrust bearings (due to deflection of the shaft), the thrust bearings can be subjected to an asymmetrical axial load with respect to their circumference, which could severely reduce the bearing endurance life of cylindrical roller thrust bearings.

Generally, differential gearbox shafts develop very high radial and axial forces at the bevel gear, which are absorbed in known designs by tapered roller bearings, cylindrical roller bearings, ball bearings, angular contact ball bearings or combinations of these bearings.

If transmission of higher power is desired, the rotational speed of the gearbox shafts generally is increased to avoid enlarging the dimensions of the gearbox excessively. This is usually accomplished in the multi-speed gearbox which drives the differential shaft. Using such methods, the resulting loads on the shafts and gears can be kept low. The higher rotational speeds, however, lead to increasing encroachments upon the rotational speed limit of the bearing, as well as to rising frictional horsepower with increasing speed.

Current differential gearbox input shafts usually are supported in tapered roller bearings, which reach their carrying capacity only after a higher axial preload is applied. At higher speeds, however, this preload leads to sharply growing frictional horsepower losses, which are no longer acceptable.

In addition, the increasing demand for simple and rapid initial assembly, as well as simple disassembly and reassembly with simple tools in the event of an overhaul of the vehicle transmission, can no longer allow the selection of tapered roller bearings. The precise control of preload they require is possible only with costly gaging and at the minimum requires the employment of trained personnel. However, this is not always assured, especially if the vehicles is exported into less technically developed countries.

The alternative selection of radial cylindrical roller bearings in combination with ball bearings or double angular contact bearings is not always favorable, as revealed by the German magazine "Walzlagertechnik" (Rolling Contact Bearing Technology) FAG 1984/2 Porsche Sports Racing Cars 956—Peak Performance Even for Rolling Contact Bearings, page 28. For one, the selection of a radial cylindrical roller bearing in conjunction with a ball bearing may not even be possible for heavy loads, since such a structure requires greater space, which simply is not available. For another, the selection of a radial cylindrical roller bearing together with an angular-contact ball bearing results in an undesirable cost increase.

The German publication from FAG Kugelfischer Georg Schaefer & Co. Schweinfurt,"The Design of Rolling Contact Bearings", Publication Number 00200DA, 1970, page 59 reveals a truck pinion bearing arrangement of the aforementioned type where the radial forces are absorbed by two radial cylindrical roller bearings and the axial forces are separately absorbed by two angular contact ball bearings. This bearing arrangement should result in low friction, temperature and wear with a high rotational speed limit and stiffness. In addition, the pinion can be located axially by inserting shims between the angle bushing clamped by the angular contact ball bearings and the gearbox housing, so that it can be brought to the correct position relative to the ring gear. However, angular contact ball bearings demand relatively high manufacturing requirements resulting in higher costs.

Page 15 the same publication reveals a bearing arrangement for a lathe spindle that combines a radial cylindrical roller bearing with two axial ball thrust bearings. The endurance life of axial ball thrust bearings decrease rapidly with increasing shaft deflection in the vicinity of the bearing. This is tolerable in a lathe, since a lathe spindle is not allowed to deflect and hence is relatively large in diameter. It would not be tolerable in a differential shaft.

In gearbox shafts which are designed to be relatively thin, for reasons of weight and cost, and that deflect under the various forces applied (deflection can occur in gearbox shafts, for example, that are subject to unilateral gear loads), the axial thrust bearings are loaded non-uniformly around their circumference and consequently must be designed to be correspondingly massive. The deflection of a gearbox shaft can lead to increased loads on ball and roller thrust bearings, whose endurance life rapidly decreases with increasing angular deflection. In conventional bearing arrangements, such as tapered roller bearings, or in arrangements with angular contact ball bearings, shaft deflections do not have as much of a detrimental effect as with simple ball or roller bearings, since the former admit of a greater angular error compared to the latter.

SUMMARY OF THE INVENTION

The object of the present invention is to provide a bearing assembly that can overcome the problems cited, and that can be configured in a particularly compact arrangement, requiring a minimum of space. Further objects are to provide a bearing that contains easily manufactured bearings, that has low friction losses at high speeds and that permits simple assembly and adjustment of the distance to the cone of the bevel of a differential gear shaft.

These objects are achieved according to the present invention by using cylindrical roller thrust bearings for the axial thrust bearings and using a bearing housing and/or the bearing mounting in the gearbox housing which is so designed that the portions of the bearing housing that support the cylindrical roller thrust bearings conform to the inclination of the gearbox shaft during deflection of the shaft.

The bearing assembly according to the present invention is formed of at least one radial cylindrical roller bearing and two axial thrust bearings. The inner race of the cylindrical roller bearing is supported on the shaft radially and in one axial direction. The thrust bearings are arranged on either side of a bearing housing that can be secured to a gearbox housing and are supported thereon. The side of the thrust bearing facing the radial cylindrical roller bearing is supported in that direction on the inner race of the radial cylindrical roller bearing. The thrust bearing assembly is secured to the shaft against axial movement in both directions, so that the bearing assembly consisting of the cylindrical roller thrust bearings can be loaded in both directions. Thus, the radial cylindrical roller bearing and the thrust bearings are secured against axial motion on the shaft.

According to the invention, the bearing housing deflects under the axial loads so that its contact surfaces (which support the stationary races of the cylindrical roller thrust bearings) move perpendicular to the tangent of the shaft deflection curve in the vicinity of the bearing. As a result, the cylindrical roller thrust bearings are loaded largely uniformly around their entire circumference. Only this uniform loading of the bearing makes use of cylindrical roller thrust bearings possible in the drive lines of vehicle transmissions.

The bearing assembly according to the invention has the advantage that it permits use of relatively small cylindrical roller thrust bearings, that are simple to manufacture at low cost. Use of such small bearings permits a compact design of the bearing assembly, which nevertheless is capable of absorbing large axial and radial loads at high rotational speeds. The bearing assembly according to the invention also shows very low friction losses at high rotational speeds.

The distance to the cone of the bevel gear of a differential drive shaft can be measured with very simple means, for example, a depth gage, and can be adjusted by the addition of shims. Measurement and adjustment of the friction torque is eliminated in the bearing assembly according to the invention, since no tapered roller bearings are used. Furthermore, a bearing assembly according to the invention can be completely preassembled outside the gearbox housing, since the bearing housing can be attached to the thrust bearing assembly before final assembly. Many adjusting procedures, measurement procedures and operating tests also can be performed outside the housing, for example, for synchronizing gears and synchronizers mounted on the shaft.

Preferably, the bearing and shaft are designed for use as a compact completely pre-assembled unit. In such a design, it is advantageous to use a radial cylindrical roller bearing whose outer race is provided with flanges at its sides that secure the bearing rollers against axial movement. Such cylindrical roller bearings are classified as form NUP. The inner race has only one flange that is axially supported by the shaft. On its opposite side the rollers are immediately adjacent to the race of the adjoining roller thrust bearing. In such a design the outer race of the radial cylindrical roller bearing is a fixed component of the bearing assembly, even if this has not yet been assembled into the gearbox housing. The outer surfaces in the axial direction of the two bearing races are aligned with each other and permit measurement of distance to the cone of the bevel gear, even if the inner race is not accessible.

To adjust the axial position of the shaft, for example, to adjust the distance to the cone of the bevel gear, axial spacing means can appropriately be inserted between the bearing housing and the gearbox housing. Shims of various thicknesses may be provided for this purpose that can be selected depending on the requirements and inserted between a radial contact surface of the bearing housing and a corresponding radial contact surface in the housing. The contact surface of the bearing housing may extend beyond the radial dimension of the radial bearing, so that the distance between the contact surface and the face of the radial bearing facing in the same direction (a dimension that is critical for the axial location of the shaft) can easily be determined by means of a depth gage. This measurement is also possible if the bevel gear is configured as a spiral bevel gear and extends radially beyond the inner race of the radial bearing.

It has been found that very good bearing endurance lives can be attained with a properly aimed design of the axial preload of the cylindrical roller thrust bearings and an appropriate metering of the roller thrust bearing lubrication. The axial preload is very low in comparison to the required preload for tapered roller bearings. In particular it is essential that the bearing rollers roll operate under all operating conditions without any sliding, since sliding can lead to wear.

According to a further embodiment of the invention a stationary race of the roller thrust bearing is located to either side of the bearing housing and is supported against it. Preferably, each cylindrical roller thrust bearing contains a stationary race supported against the bearing housing. The bearing housing then is provided with at least one recess that accommodates at least one spring by means of which the two stationary races are forced away from each other. The springs may be compression springs that apply some preload to the rollers of the opposing roller thrust bearings, so as to assure rolling of the rollers on the bearing races and no sliding can occur.

A retaining ring is installed in a groove in the shaft, in particular on the side of the thrust bearing assembly axially opposite the radial bearing to avoid axial movement of the thrust bearing assembly on the shaft. Preferably, the location and width of the groove are designed in such a way that it is able to accept retaining rings of varying thicknesses. Axial manufacturing tolerances of the radial bearing and the thrust bearing assembly may be equalized by an appropriate selection of the thickness of the retaining rings.

In order to supply an appropriate flow of lubricant to the thrust bearing assembly or to the individual thrust bearings, it is advantageous to provide in the shaft a generally axial lubricant bore and at least one cross bore connected thereto, where the cross bore is directed upward and opens in the vicinity of the thrust bearing assembly. A groove is provided in the outer contour of the shaft in the region of the outlet opening of the cross bore so that the lubricant can be distributed across the axial extent of the thrust bearing. The groove may be configured as an oval pocket extending axially along the surface of the shaft.

Preferably, the attachment of the bearing housing to the gearbox housing should be designed to be flexible to assure that the bearing housing conforms sufficiently to any deflections of the shaft. In one embodiment, the bearing housing is attached to the gearbox housing with axial bolts, e.g., necked-shank bolts, which will permit an inclination of the bearing housing with respect to the gearbox housing upon axial loading of the shaft. The spring rate of the neckedshank bolts can be designed to correspond to the requirements, so that the axial loads and shocks applied to the bearings can largely be damped.

Since the forces are not uniformly distributed around the circumference of the bearing housing when the shaft deflects, a further development of the invention proposes that the necked-shank bolts not be distributed uniformly around the circumference of the bearing housing; Instead, fewer bolts are applied in circumferential regions of the bearing housing that are subjected to increased forces due to shaft deflections, compared to the region of the circumference that are loaded less heavily.

According to a preferred embodiment of the invention, the bearing housing is provided with a radial ring region to attain uniform bearing load when the shaft deflects. This radial ring region lies between the contact surface of the shaft bearing, that may, in particular, be a thrust bearing assembly, and the portion of the bearing housing attaching to the overall transmission housing. The stiffness of the bearing housing is reduced, that is, made softer or more flexible, in those circumferential regions in which the bearing assembly would have had to carry the principal load if the bearing housing had been configured as rigid, and its stiffness is increased in those circumferential regions in which the bearing assembly would carry only a small load. In this fashion, the bearing housing deflects partially under a load and conforms to the deflection of the shaft. The bearing assembly therefore provides support around its entire circumference and permits a uniform load on the cylindrical roller thrust bearings.

The inner ring region of the bearing housing, which supports the stationary races of the cylindrical roller thrust bearings, on the other hand, should be configured as a stiff ring that does not participate in the deflection of the remainder of the bearing housing. The surfaces in contact with the stationary races of the ring region are oriented in a plane that is perpendicular to the tangent to the deflection curve of the shaft in the vicinity of the bearing.

Between the radially inward attachment to the thrust bearing and the radially outward attachment to the transmission housing, the bearing housing preferably is provided with a concentric ring area of varying axial thickness. The thickness variations can be achieved appropriately by a circular groove with a depth varying in circumferential direction or by a configuration with a wedge-shaped cross section. According to a further development of the invention, the circular groove is concentric to an axis that is slightly inclined to the axis of the bearing housing. The angle of the inclination depends upon the required deflection of the bearing housing and may amount to a few degrees.

It has been found that a continuous reduction in material thickness along a cross sectional line can result in a bearing housing with an angular deflection along a line perpendicular to the cross sectional line. It is therefore appropriate to provide on at least one side of the bearing housing pockets extending generally in circumferential direction in the ring region. Length, width and shape of the pockets are so designed that they oppose the angular deflection.

The amount of the bearing load and the resulting required differences in stiffness may be determined by strain gage testing.

BRIEF DESCRIPTION OF THE DRAWINGS

The invention will be further described with references
drawings, in which.

DETAILED DESCRIPTION OF THE PREFERRED EMBODIMENTS

Figure 1:
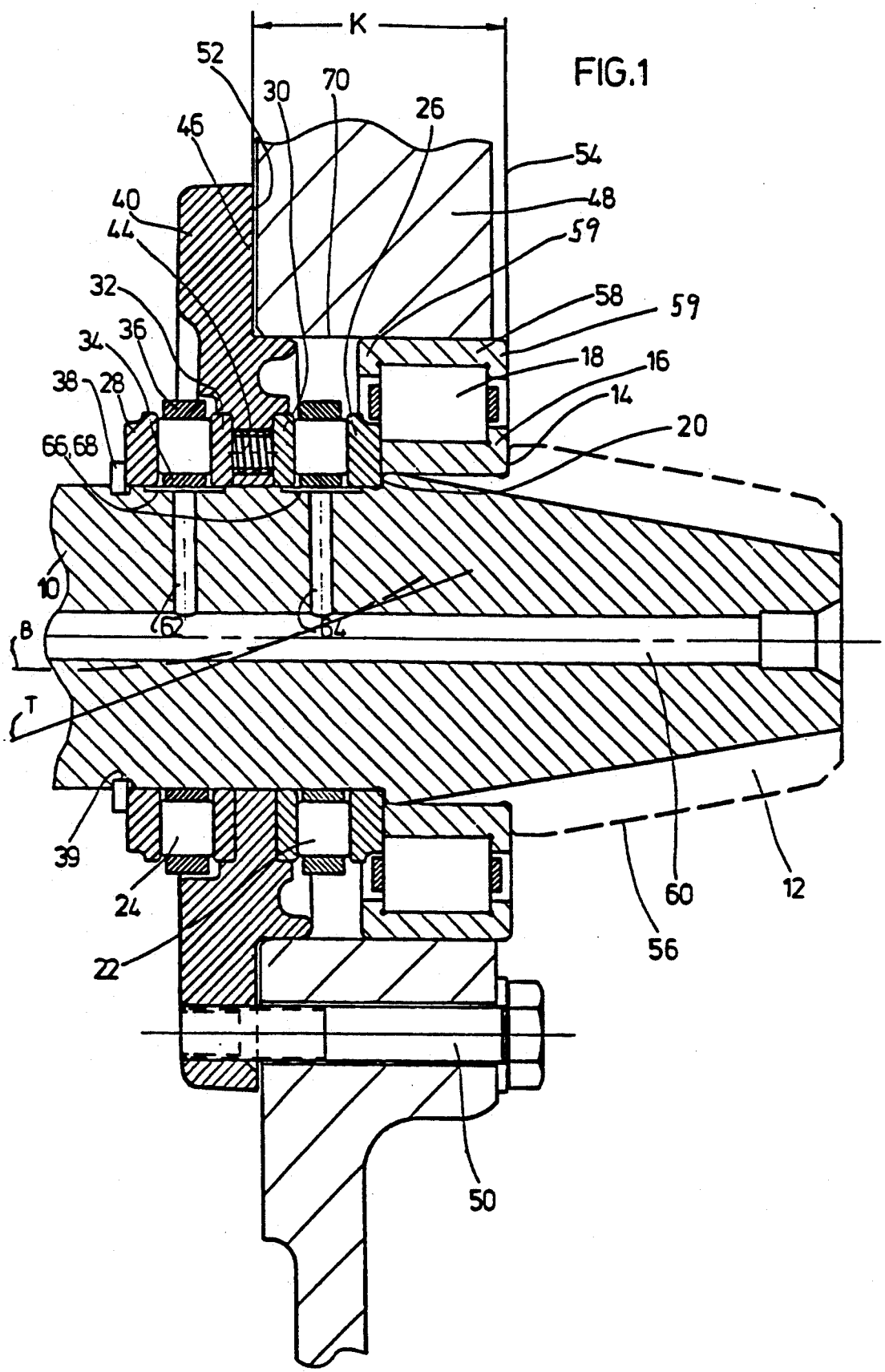
FIG. 1 shows a cross-section through a bearing assembly according to the invention.

FIG. 1 shows a gearbox shaft 10 with a bevel pinion 12, which may, for example, be a differential gearbox input shaft for the transmission of an agricultural tractor. Adjacent to the bevel gear the shaft 10 is provided with a shoulder 14, with which the inner race 16 of a radial cylindrical roller bearing 18 of the NUP type is in contact and is supported in the axial direction (to the right). The inner race 16 is provided with a flange that fixes the bearing rollers in the axial direction only on the side facing the shoulder 14. A further shoulder 20 is provided on the shaft 10, located at a distance from the aforementioned shoulder 14 and which is somewhat smaller than the bearing inner race 16.

On the side of the radial cylindrical roller bearing 18 away from the bevel pinion 12, the gearbox shaft 10 engages a thrust bearing assembly having two cylindrical roller thrust bearings 22, 24. Each of these cylindrical roller thrust bearings 22, 24 includes a rotating race 26, 28 and a stationary race 30, 32, respectively. Cylindrical rollers and a cage also are arranged between the races 26 and 30 or 28 and 32, respectively. Each cage contains an inner ring 34 and an outer ring 36. Each outer ring 36 is reinforced in its radial direction to prevent any escape of the cylindrical rollers.

The rotating race 26 of the cylindrical roller thrust bearing 22 is the race nearest to the radial cylindrical roller bearing 18, and is supported axially against the inner race 16. The rotating race 28 of the other cylindrical roller thrust bearing 24 farthest from the radial cylindrical roller bearing 18, and is prevented from any axial movement by a retaining ring 38. This retaining ring 38 engages a groove 39 in the surface of the shaft 10.

As shown in the drawing, the groove 39 preferably is clearly wider than the anticipated thickness of the retaining ring 38. This permits use of retaining rings 38 of various thicknesses to compensate for manufacturing tolerances in the components assembled between the first shoulder 14 and the retaining ring 38 while securing the components against axial movement. For example, by this means an axial clearance of the gearbox shaft 10 can be established that is less than 0.1 millimeters.

If desired, the retaining ring 38 may be replaced by a nut. This would permit an even simpler adjustment of the axial position of the gearbox shaft. However, this method leads to increased cost and space requirements for the bearing assembly, particularly since the nut must be secured against rotation.

A bearing housing 40 is clamped between the stationary races 30, 32 of the two cylindrical roller thrust bearings 22, 24. An inner portion of the bearing housing 40 has five axial bores 42 (see FIG. 2), into which compression springs 44 are inserted. The compression springs 44 force the two stationary races 30, 32 away from each other. If either of the cylindrical roller thrust bearing 22, 24 is unloaded, this provides a preload which is just sufficient and thereby makes it possible for the unloaded cylindrical roller thrust bearing 22, 24 to operate without any problems. Without such a preloading, there is the danger that the rollers of the unloaded cylindrical roller bearing 22, 24 would not perform a pure rolling motion on the races 26, 30; 28, 32, causing wear.

Figure 3:
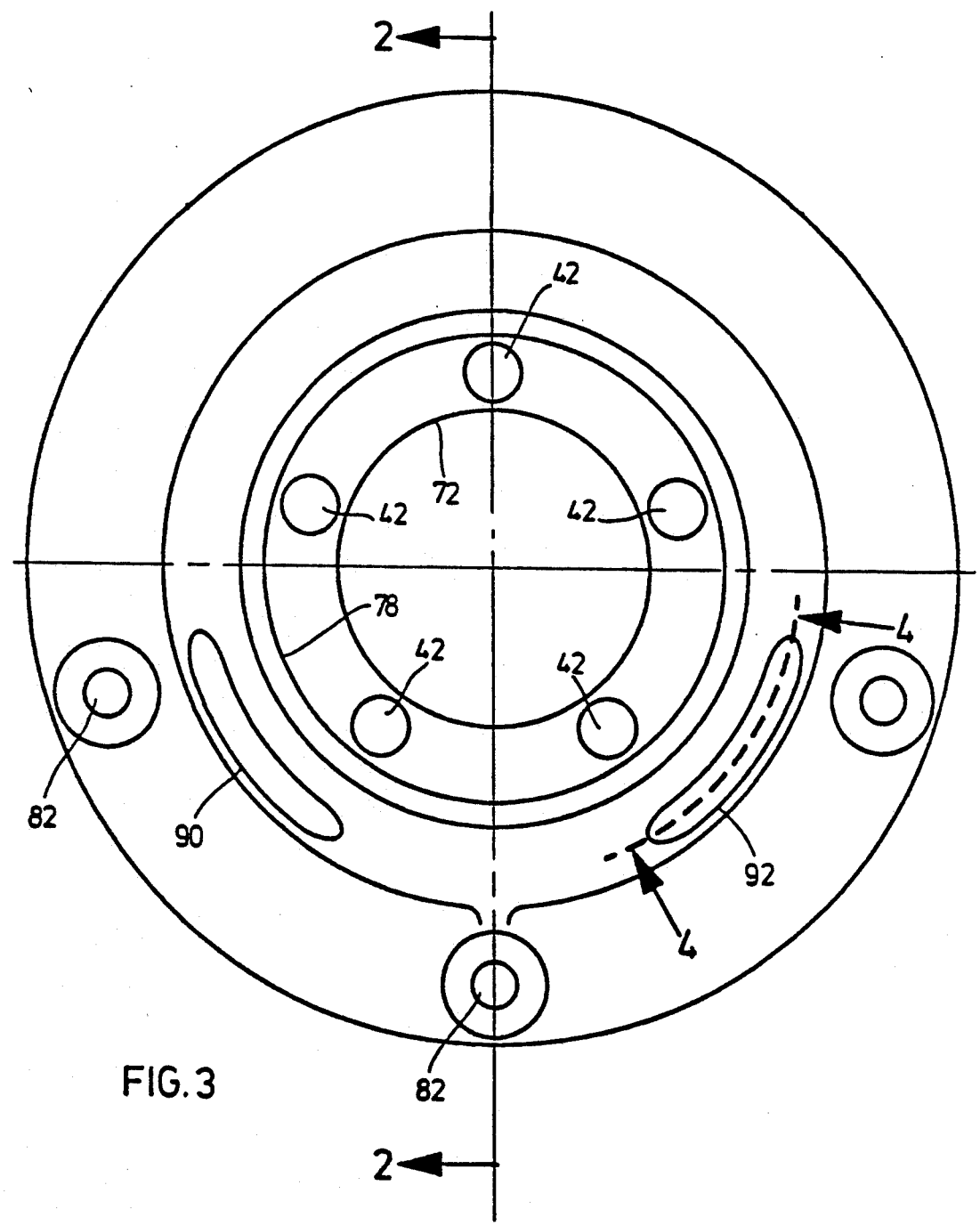
FIG. 3 shows a side view of the bearing housing portion of FIG. 1.

The bearing housing 40 has an outer contact surface 46 that faces in the direction of the bevel pinion 12 of the gearbox shaft 10 and that allows for the attachment of the bearing assembly to the gearbox housing 48. Preferably, three necked-shank bolts 50 are provided for this purpose, arranged in the lower half of the bearing housing as shown in FIG. 3. (By putting all of the bolts 50 in the lower half of the housing, the upper half of the bearing housing can deflect to the left upon deflection of the shaft 10, as discussed further below.) Shims 52 of various thicknesses can be inserted between the contact surface 46 and the gearbox housing 48 to control the location of the point of the cone of the bevel gear.

The required thickness of the shims can be determined easily by measuring the distance K. Since the contact surface 46 faces in the same direction as the side surface 54 of the outer race of the radial cylindrical roller bearing 18, the distance K between the contact surface 46 and the side surface 54 can be measured very easily with a depth gage. The outer race 58 of the radial cylindrical roller bearing 18 has flanges 59 on both its sides through which the bearing rollers are fixed axially. The side surface 54 of flange 59 aligns with the side surface of the inner race 16, which abuts the shoulder 14 of the bevel gear 12. Thus, the distance K is directly related to the position of the bevel gear 12. This distance K can be measured even if the bevel gear is configured as a spiral bevel gear and extends beyond the inner race 14 of the radial cylindrical roller bearing 18 along the dashed line 56, because the side surface 54 being used as reference surface is well outside of the bevel gear An axial bore 60 is provided in the gearbox shaft 10 to supply lubricant to the cylindrical roller thrust bearings 22, 24. Two radial cross bores 62, 64 branch off in an upward direction from this bore 60 and open on the shaft surface centrally underneath the associated cylindrical roller thrust bearing 22, 24. A groove 66, 68 is provided in the surface of the gearbox shaft 10 in the vicinity of each outlet opening. The groove may, for example, have the shape of an oval pocket whose longitudinal axis is parallel to the shaft axis and whose cross axis is oriented in circumferential direction. This configuration of the pockets permits a uniform and metered distribution of the lubricant over the axial extent of each cylindrical roller thrust bearing 22, 24.

The outer race 58 of the radial cylindrical roller bearing engages a bore 70 in the gearbox housing 48 and is supported thereon in radial direction. In this manner, the radial cylindrical roller bearing 18 absorbs only the radial forces and transmits them to the gearbox housing 48. The two cylindrical roller thrust bearings 22, 24 absorb the axial forces exclusively, which may act in the one as well as the other axial direction, and transmit those forces through the bearing housing 40 to the gearbox housing 48.

In a typical application, the shaft 10 will deflect according to the shaft deflection curve B, shown in exaggerated form in FIG. 1, and depending upon the amount of the associated axial bearing load. As a result, it would be preferable for the bearing housing 40 to be oriented effectively perpendicular to the tangent T to the shaft deflection curve B.

To do this, the bearing housing 40 is configured generally as a flat circular component with a central bore 72 (see FIG. 2), whose diameter conforms to the outside diameter of the gearbox shaft 10. A concentric inner ring 74 is provided on either side with recesses 76, 78 which support the stationary races 30, 32. The outer circumference the bearing housing 40 carries a flange-chaped outer ring 80, which contains threaded holes 82 for the bolts 50.

The region between the inner ring 74 and the outer ring 80 of the bearing housing 40 has a generally wedge-shaped cross section. The wedge shape results from a recess 84 located on he left side of the bearing housing 40 (see FIG. 2) that intrudes deeper at the top than at the bottom into the bearing housing 490. ON the opposite side, a projection 86 is integrated into he bearing housing 40 to extend further beyond the outer ring 80 at the bottom than at the top. This projection 86 also contains a ring groove 88 that intrudes more deeply into the component at the top than at the bottom.

Due to this configuration, the stiffness of the bearing housing 40 is not homogeneous in the circumfernetial direction. Instead, the stiffness decreases in they circumferential direction from bottom to top. Upon deflection of the gearbox shaft, the resulting axial forces will deflect the bearing housing 40 due to the variation in stiffness in the region between the inner ring 74 and the outer ring 890 k, so that the load on the cylindrical roller thrust bearings 22, 24 takes on approximately equal values in the circumferential direction.

Figure 2:
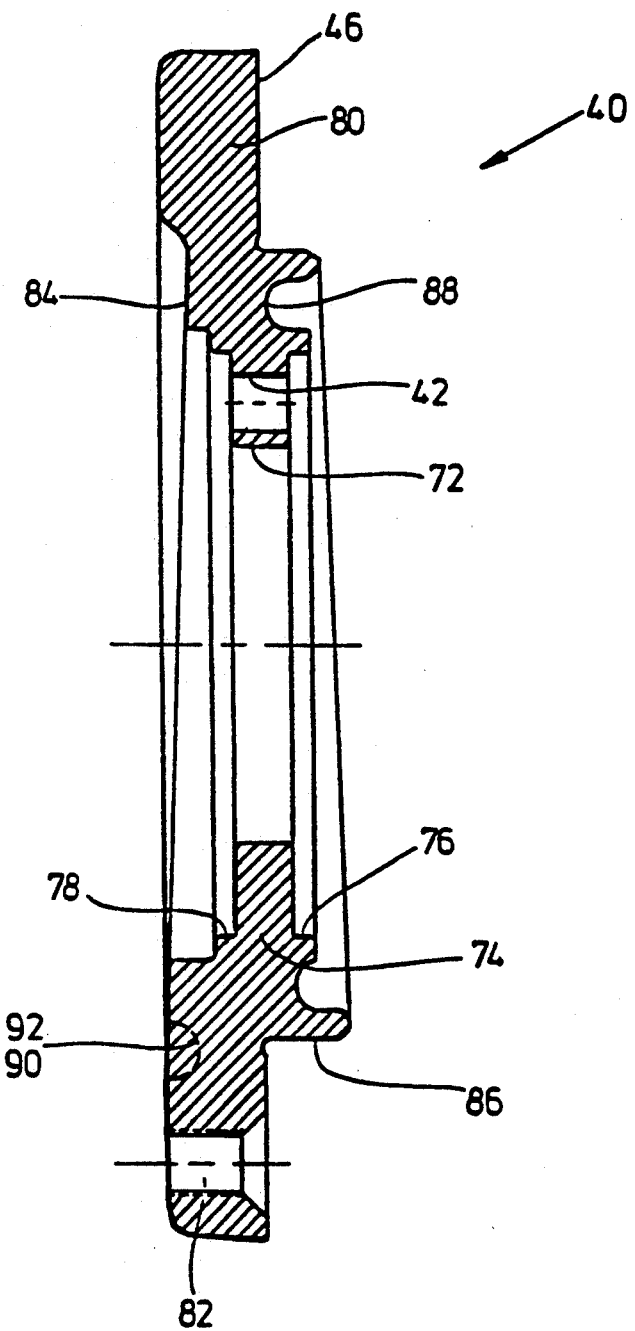
FIG. 2 shows an axial section through the bearing housing portion of FIG. 1 along the line 2—2 in FIG. 3.
Figure 4:
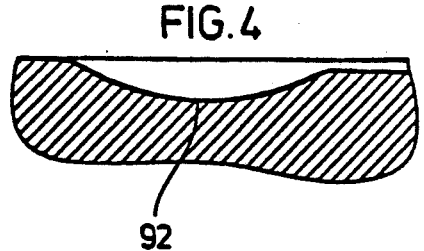
FIG. 4 shows a frontal section of the bearing housing portion of FIG. 1 along the line 4—4 in FIG. 3.

With a bearing housing 40 as just described, bending forces may produce a greater deflection along a line outside the axis. To counteract any permanent set in the angular direction, the material thickness of the bearing housing 40 may be reduced locally. For this purpose, the side opposite the groove 88 is provided with two pockets 90, 92 (see FIG. 3) in the lower region of the bearing housing 40, symmetrical to the vertical centerline. The cross section of these pockets 90, 92 along the line 4—4 is configured as a circle segment and is illustrated in FIG. 4. The cross section in the radial direction of the bearing housing 40 is shown in FIG. 2 with a dashed line.

Industrial Applicability

Installation of the bearing assembly may be performed as follows:

The radial cylindrical roller bearing 18, the first cylindrical roller thrust bearing 22, the bearing housing 40 with the compression springs 44 inserted into the bores 42, and the second cylindrical roller thrust bearing 24 are slid onto the gearbox shaft 10 in that order. A suitable retaining ring 38 then is selected so that the axial clearance of the bearings 18, 22, 24 on the gearbox shaft 20 lies within the required limits and is then assembled. The pre-assembled bearing assembly can now be inserted into he bore 70 of the gearbox housing 48 and secured there by the bolts 50. To adjust the location of the point of the cone of the bevel gear, the distance between the contact surface 46 and the side surface 54 may be measured and shims 52 of appropriate thickness inserted between the bearing housing 40 and the gearbox housing 48 before the installation of the bearing assembly into the gearbox housing 48.

The bearing assembly can be disassembled by reversing the above process.

As will be apparent, neither special tools nor special measuring devices are required or assembly or disassembly of the bearing assembly, or to adjust the axial location of the gearbox shaft 10. Assembly and disassembly is simple and can be accomplished by less qualified personnel.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A bearing assembly for supporting in a gearbox housing (48) a gearbox shaft (10) which is subject to bending forces and able to absorb axial forces, the bearing assembly having:
   (i) at least one radial cylindrical roller bearing (18), whose inner race (16) is supported radially and axially on the shaft (10) and whose outer race (58) is supported radially in the gearbox housing (48);
   (ii) a bearing housing (40) supported by the gearbox housing (48);
   (iii) attachment means (50) for attaching the bearing housing (40) to the gearbox housing (48);
   (iv) two thrust bearings arranged to either side of the bearing housing (40), where the thrust bearing facing the radial cylindrical roller bearing (18) is supported in the axial direction by the inner race (16) of the radial cylindrical roller bearing (18); and
   (v) fixation means for securing the radial cylindrical roller bearing (18) and the thrust bearings against axial movement to the gearbox shaft (10);
characterized in that
   (a) the thrust bearings are axial cylindrical roller thrust bearings (22, 24); and
   (b) the bearing housing (40) is flexible so that at least the portion of the bearing housing (40) that supports the cylindrical roller thrust bearings (22, 24) conforms to the inclination of the gearbox shaft (10) during deflection of the shaft.

2. Bearing assembly according to claim 1, characterized in that the outer face (58) of the radial cylindrical roller bearing (18) has side flanges which fix its rollers against axial movement and the the bearing assembly consisting of the radial and axial cylindrical roller bearings (18, 22, 24) as well as the bearing housing (40) are configured as a pre-assembled unit that can be inserted into the gearbox housing (48) and removed from it as a unit.

3. Bearing assembly according to claim 1 or 2, characterized in that the bearing housing (40) is configured as a flange and is provided with a radial contact surface (46) that faces a corresponding radial contact surface of the gearbox housing (48) and that at least one shim (52) can be inserted between the contact surfaces (46) of the bearing housing (40) and the gearbox housing (48).

4. Bearing assembly according to claim 1, characterized in that each cylindrical roller thrust bearing (22,24) has a stationary race (30,32) which is supported by and to either side of the bearing housing (40) and that at least one recess (42) is provided in the bearing housing (40) that engages at least one spring (44) by means of which the two stationary races (30,32) are forced away from each other.

5. Bearing assembly according to claim 1, characterized by the race that the side of the outer rotating race (28) of the outer cylindrical roller thrust bearing (24) which faces away from the radial cylindrical roller bearing (18) is secured against axial movement on the shaft (10) by a retaining ring (38) that engages a groove (39) in the shaft (10), and that the groove (39) is of such a width that it can engage retaining rings (38) of various thicknesses.

6. Bearing assembly according to claim 1, characterized in that the shaft (10) contains a generally axial bore (60), at least one cross bore (62, 64) connected thereto for the supply of lubricant to the cylindrical roller thrust bearings (22, 24), and a groove (66, 68) located on the outer surface of the shaft (10) in the vicinity of a thrust bearing (22, 24) into which the cross bore (62, 64) opens.

7. Bearing assembly according to claim 1, characterized in that said attachment means comprises axial bolts (50) which are not uniformly distributed around the circumference of the bearing housing (40), but that fewer bolts (50) are arranged regions of the circumference of the bearing housing (40) that are subject to increased forces as a result of shaft deflection, compared to regions of the circumference that are less heavily loaded.

8. Bearing assembly in particular according to claim 1, characterized in that a bearing housing (40) is provided that exhibits sections of differing stiffness in the circumferential direction at least in one region between a contact surface of the shaft bearing (22, 24) and a contact surface of the gearbox housing (48).

9. Bearing assembly according to claim 8, characterized in that the bearing housing (40) is generally concentric and is provided with regions of differing thickness in the circumferential direction in a concentric ring area between a radially inward flange region that supports the cylindrical roller thrust bearings (22, 24) and a radially outward flange region used for the attachment to the gearbox housing (48).

10. Bearing assembly according to claim 8 or 9, characterized in that the bearing housing (40) is provided with an axial ring groove (88) with an axial depth varying in the circumferential direction on at least one of its two sides in a concentric ring region between a radially inward flange vicinity that supports the cylindrical roller thrust bearings (22, 24) and a radially outward flange area used for the attachment to the gearbox housing (48), where the ring groove (88) is located concentric to an axis that is inclined with respect of the axis of the bearing housing (40).

11. Bearing assembly according claim 8 or 9, characterized by the face that on at least one side surface of the bearing housing (40) pockets (90, 92) extending generally in circumferential direction are provided in the ring region.

* * * * *

UNITED STATES PATENT AND TRADEMARK OFFICE
CERTIFICATE OF CORRECTION

PATENT NO. : 5,261,750
DATED : November 16, 1993
INVENTOR(S) : Uli Eckhardt

It is certified that error appears in the above-indentified patent and that said Letters Patent is hereby corrected as shown below:

In Col., 9, line 56, change "the", (second occurrence) to --that--.

In Col. 10, line 12, delete "race", (first occurrence), and insert -- fact --.

In Col. 10, line 32, after "arranged", insert -- in --.

In Col. 10, line 63, delete "face" and insert -- fact --.

Signed and Sealed this

Fifteenth Day of March, 1994

Attest:

BRUCE LEHMAN

Attesting Officer

Commissioner of Patents and Trademarks